United States Patent

[11] 3,582,634

[72] Inventor William F. Bartlett
Rochester, N.Y.
[21] Appl. No. 776,051
[22] Filed Oct. 15, 1968
[45] Patented June 1, 1971
[73] Assignee Stromberg-Carlson Corporation
Rochester, N.Y.

[54] ELECTRICAL CIRCUIT FOR MULTIPLYING SERIAL BINARY NUMBERS BY A PARALLEL NUMBER
1 Claim, 2 Drawing Figs.

[52] U.S. Cl. .......... 235/164
[51] Int. Cl. .......... G06f 7/39
[50] Field of Search .......... 235/164

[56] References Cited
OTHER REFERENCES

Richards, R.K. Arithmetic Operations In Digital Computers. Princeton, N.J., D. Van Nistrand, 1955. p.155— 156. TK 7888.3.R5

*Primary Examiner*—Malcolm A. Morrison
*Assistant Examiner*—R. Stephen Dildine, Jr.
*Attorney*—Hoffman Stone

ABSTRACT: A binary number represented by time spaced electrical pulses and intervals is multiplied by a binary multiplier represented by electrical conditions at plural spaced-apart terminals. The multiplicand is multiplied sequentially by the successive digits of the multiplier to produce partial products. The partial products are applied to binary adders and cumulatively added to produce a final product. The multiplications are done by selectively inhibiting and partially enabling gates at the inputs to the adders in accordance with the digits of the multiplier. The multiplicand signals are applied through a shift register to the gates in sequence. The adders are arranged for serial addition and in cascade.

OPERATING CHARACTERISTICS OF ADDERS

| | | | | | | | | |
|---|---|---|---|---|---|---|---|---|
| a | 0 | 1 | 0 | 0 | 1 | 1 | 0 | 1 |
| b | 0 | 0 | 1 | 0 | 1 | 0 | 1 | 1 |
| c | 0 | 0 | 0 | 1 | 0 | 1 | 1 | 1 |
| SUM | 0 | 1 | 1 | 1 | 0 | 0 | 0 | 1 |
| CARRY | 0 | 0 | 0 | 0 | 1 | 1 | 1 | 1 |

INVENTOR
WILLIAM F. BARTLETT

BY Hoffman Stone
ATTORNEY

ELECTRICAL CIRCUIT FOR MULTIPLYING SERIAL BINARY NUMBERS BY A PARALLEL NUMBER

BRIEF SUMMARY

This invention relates to a novel method of an apparatus for multiplying binary numbers electrically, and, more particularly, to a method of and apparatus for multiplying a so-called serial number by a so-called parallel number.

Arrangements have been heretofore proposed for multiplying numbers electrically wherein both the multiplicand and the multiplier are represented by space divided signals, as in static registers, and also wherein both the numbers are in serial, or time divided form represented by time spaced series of electrical pulses and intervals.

The present invention provides a sort of hybrid arrangement wherein the multiplicand is represented by a series of time spaced signals, and the multiplier by space divided signals. The arrangement is very simple, and is expected to be found advantageous for use in situations where it is desired to multiply various different numbers by a common factor, or to feed data from a space divided, or parallel system into a time divided system. It also accomplishes the multiplication in the theoretically minimum time, the time occupied by the serial product.

Briefly, the method of the invention entails multiplying the multiplicand sequentially by the successive digits of the multiplier to produce partial products, and then cumulatively summing the partial products to produce a final product in serial form.

The circuit required for these operations is simple. In the embodiment described herein, all that is required is a shift register having a number of stages equal to one less than the number of digits in the multiplier it is desired to provide for, and a group of conventional adders equal in number to the stages of the shift register. In addition, a static register is required for storing the multiplier, but this may often be part of the existing equipment for which the circuit is designed such as, for example, the output of a space divided calculator.

DETAILED DESCRIPTION

Figures 1, 2:
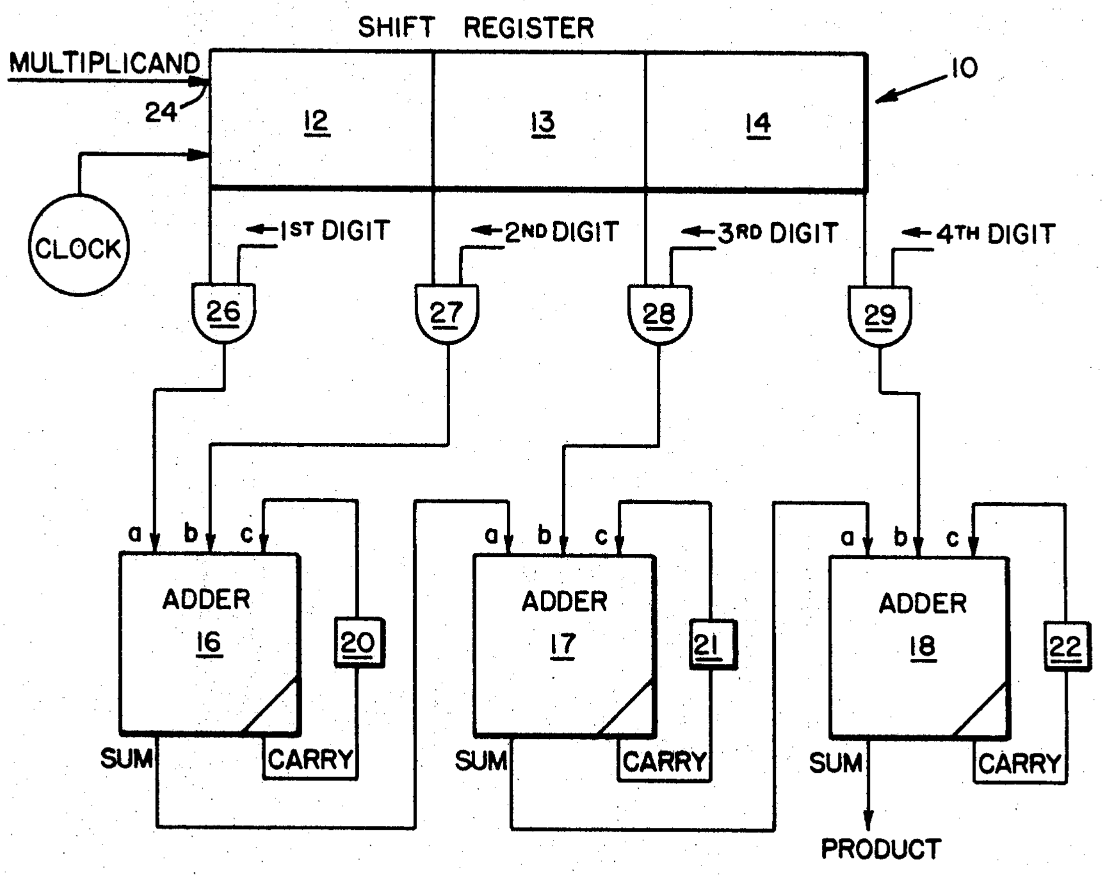

A presently preferred embodiment of the invention will now be described in connection with the accompanying drawing, wherein:

FIG. 1 is a schematic block diagram of a multiplier circuit according to the presently preferred embodiment of the invention; and FIG. 2 is a chart showing the operating characteristics of the adders in the circuit.

As shown, the circuit of the invention includes a shift register 10 having three stages 12, 13, and 14, respectively, thus providing for a multiplier having four digits. If it is desired to provide for larger multipliers, additional stages are provided in the register 10, one for each additional digit of the multiplier. Three adders 16, 17, and 18 of any desired type, having the operating characteristics illustrated in FIG. 2, are provided for cumulatively adding the partial products produced in the multiplication. Each of the adders has three inputs *a*, *b*, and *c*, a SUM output and a CARRY output. In the conventional way, the CARRY output is applied through a time delay device 20, 21, or 22 to one of the inputs. When binary signals representing zeros are present at all three of the inputs *a*, *b*, and *c* of any one of the adders, signals also representing binary zeros are produced at both outputs. When signals representing zeros are present at two of the inputs and a signal representing a binary one is present at the third, the SUM output represents a binary one, and the CARRY output a binary zero. When signals indicating binary ones are present at two of the inputs and a zero at a third, the SUM output is a zero and the CARRY output a one. When signals representing binary ones are present at all three inputs, both outputs register binary ones. The delay devices 20, 21, and 22 are characterized by delays equal to one time slot, or bit of the serial multiplicand, and may be synchronized by the system clock in the conventional manner, or otherwise as desired.

The multiplicand, in serial binary form, is applied at the input 24 of the shift register, and also, through a first gate 26, to one of the inputs of the first adder 16. The output of the first stage of the shift register is fed through a second gate 27 to a second input of the first adder 16. The output of the second stage 13 of the shift register is fed through a third gate 28 to one input of the second adder 17, and the output of the third stage 14 is fed through a fourth gate 29 to one of the inputs of the third adder 18. The adders are arranged in cascade with the SUM output of the first adder 16 applied to one of the inputs of the second adder 17, and the SUM output of the second adder 17 applied to one of the inputs of the third adder 18. The final product of the multiplication appears in serial binary form at the SUM output of the third adder 18.

The signals representing the multiplier are applied partially to enable or to inhibit the gates 26—29 in accordance with the identities of the digits. Typically, a signal indicating a binary one would partially enable the gate to which it is applied, and a signal indicating a binary zero would inhibit it. The digits of the multiplier are applied to the gates 26—29 in order of increasing significance. The least significant digit is applied to the first gate 26, and the most significant digit to the last gate 29. In accordance with conventional practice, the serial multiplicand is arranged so that its least significant digit occurs first, and its most significant digit occurs last. In addition, the multiplicand is followed by a number of binary zeros equal to the number of digits in the multiplier.

In operation, the gates 26—29 sequentially multiply the multiplicand by the respective digits of the multiplier to produce partial products, which are applied to the adders 16—18 and cumulatively added by them. The first and second partial products, which appear respectively at the outputs of the first two gates 26 and 27, are added by the first adder 16, which produces a first sum at the input of the second adder 17. The third partial product, which appears at the output of the third gate 28, is added to the first sum by the second adder 17 to produce a second, or intermediate, sum, which is fed to the third adder 18. The fourth partial product, which appears at the output of the fourth gate 29, is added to the intermediate sum by the third adder 18 to produce the final product at the SUM output of the third adder 18. The overall process is analogous to ordinary elementary long multiplication, except that the partial products are cumulatively summed instead of being simultaneously summed, and the summing is carried out in an overlapping manner.

An important advantage of the circuit arrangement of the invention is its economy of time. The time required for the multiplication is no longer than the duration of the serial product, the theoretical minimum under any circumstances.

What I claim is:

1. A multiplier circuit for multiplying binary numbers represented by series of time spaced electrical pulses and intervals by a binary multiplier representable by simultaneous electrical conditions at plural spaced-apart terminals comprising:

a. a shift register having stages equal in number to at least one less than the number of digits to be provided for in the multiplier, b. binary adders equal in number to at least one less than the digits to be provided for in the multiplier, said adders being arranged for serial multiplication and being connected in cascade, c. gate means connecting the input and the outputs of said register to respective inputs of said adders, the input and the first output being connected to respective inputs of the first of said adders, the remaining outputs being connected respectively to inputs of the remaining respective ones of said adders, d. means for applying signals representing the multiplier respectively to said gate means for selectively inhibiting and partially enabling them in accordance with the respective digits of the multiplier, and e. means for applying the multiplicand to the input of said register.